Feb. 10, 1959 | C. C. MOORE | 2,873,318

MAGNETIC RECORDER

Filed Nov. 25, 1953 | 2 Sheets-Sheet 1

INVENTOR.
Clarence C. Moore,
BY
Mueller & Aichele
Att'ys.

Feb. 10, 1959 C. C. MOORE 2,873,318

MAGNETIC RECORDER

Filed Nov. 25, 1953 2 Sheets-Sheet 2

INVENTOR.
Clarence C. Moore

BY
Mueller & Aichele
Atty's.

2,873,318

MAGNETIC RECORDER

Clarence C. Moore, Elkhart, Ind.

Application November 25, 1953, Serial No. 394,260

14 Claims. (Cl. 179—100.2)

This invention relates generally to magnetic recorder and reproducer devices of the type which use magnetic tape or wire, and more particularly to an improved drive and control arrangement for such recorders.

Magnetic tape and wire recording and reproducing devices which are in common use have the disadvantage that the operation thereof is not flexible and easily controlled. In such devices the tape or wire must be driven at an accurately defined speed for recording and reproducing operations, but it may be desired to drive the tape or wire at much higher speeds in either direction to wind the tape on a reel for storage or to reach a predetermined point on the tape. To provide fast movement of the tape or wire the tape should be disengaged from the recording and/or reproducing head to eliminate friction thereof and to do this has been a relatively complicated operation.

Although recorders have been developed wherein a single motor or two motors perform all the tape or wire driving functions, it has been found to be preferable to provide a separate constant speed motor for driving the tape or wire during recording or reproducing operations and two additional motors for driving the forward and rear reels on which the tape or wire is wound. In such a machine controls are required for the reel driving motors and also for controlling the position of the tape or wire so that it is either in cooperative position with the magnetic heads of the device for recording or reproducing operations, or moves freely with respect to the heads for fast tape movement in either direction.

To provide the desired control of the tape movement braking action is required. In order to stop the tape quickly after fast winding, relatively strong braking action is required. It is further helpful to provide steady movement of the tape for recording or reproducing operation, that the tape be subjected to some tension. It is also desired that slight braking action be provided when the tape is stationary so that it will remain in a given position.

Hereinafter in the description of the invention reference will be made to magnetic tape and the invention will be illustrated in connection with a machine using tape, but it will be understood that the invention applies as well to wire or strip material of any suitable form. Further, in describing the operation reference will be made to the use of the device as a recorder, but it will be obvious that the device may also be used as a reproducer and the controlled movement of the tape will be advantageous when the device is used either as a recorder or reproducer.

It is therefore an object of the present invention to provide a tape recording device having an improved tape driving and control system.

A further object of this invention is to provide a tape recording and reproducing device wherein movement of the tape at operating speed or at fast speeds in either direction may be provided by operation of a single manually operable arm.

A still further object of this invention is to provide a tape recording device wherein control of the motors connected to the reels to provide slow or fast movement thereof and various degrees of braking action thereby, and control of the position of the tape with respect to the magnetic heads of the device are provided by a single operating member.

A feature of this invention is the provision of a tape recording device wherein a single control member includes mechanical means for selectively holding the tape in operating position and switch means for controlling the application of driving and braking power to motors connected to the tape supporting reels.

A further feature of the invention is the provision of a tape recording device wherein the operating speed of the tape is controlled by a capstan in engagement with the tape and driven at a constant speed by a suitable motor, and including pressure means for holding the tape in engagement with the capstan and a control shaft coupled to the pressure means through cam means for selectively holding the pressure means in tape engaging position.

Another feature of this invention is the provision of a tape driving system wherein two tape supporting reels are driven by induction motors and energy is supplied to the induction motors through a power supply system which selectively supplies alternating current to the motors for driving the same and direct current to the motors for braking the same with the alternating current and direct current supply being controlled to provide varying speeds of operation and varying braking tensions. The power supply may include rectifier means for providing a pulsating direct current for use in braking.

Further objects and features, and the attending advantages of the invention will be apparent from a consideration of the following description when taken in connection with the accompanying drawings, in which.

In practicing the invention there is provided a magnetic recording and reproducing device which includes two reels on which the tape or wire is supported. A motor is connected to each reel and the reels may be rotated in either direction so that the tape may be wound in a forward direction as for recording or reproducing operation or may be rewound in a reverse direction. The tape extending between the reels passes along magnetic heads which may be for recording, reproducing and erasing action. Adjacent the heads a capstan is provided which is driven by an additional motor which drives the capstan at a constant rate of speed. A pressure bar is provided on the side of the tape opposite the recording heads and capstan for holding the tape firmly against the recording heads and against the capstan. The position of the pressure pad is controlled by a cam provided on a control shaft so that by movement of the shaft the pressure arm may be held in a position engaging the tape or may be released therefrom. Connected to the control shaft is a switch structure which controls the application of energy to the reel driving motors. These motors may be of the induction type whereby the speed thereof depends upon the alternating current voltage applied thereto. The motors also provide braking action in response to the application of direct current thereto. The switch structure controls the application of alternating and direct current to the motors so that they may operate to drive the tape in either direction at fast speeds or in the forward direction at slow speed for operation of the system, and may provide braking action as required for accurately controlling the tape movement or to provide a quick stop of the tape when it is being driven at a fast rate. A single control shaft controls the application of power to the motors and the position of the pressure arm in a synchronized manner so that complete control of the operation is provided by movement of a single arm.

Figure 1:
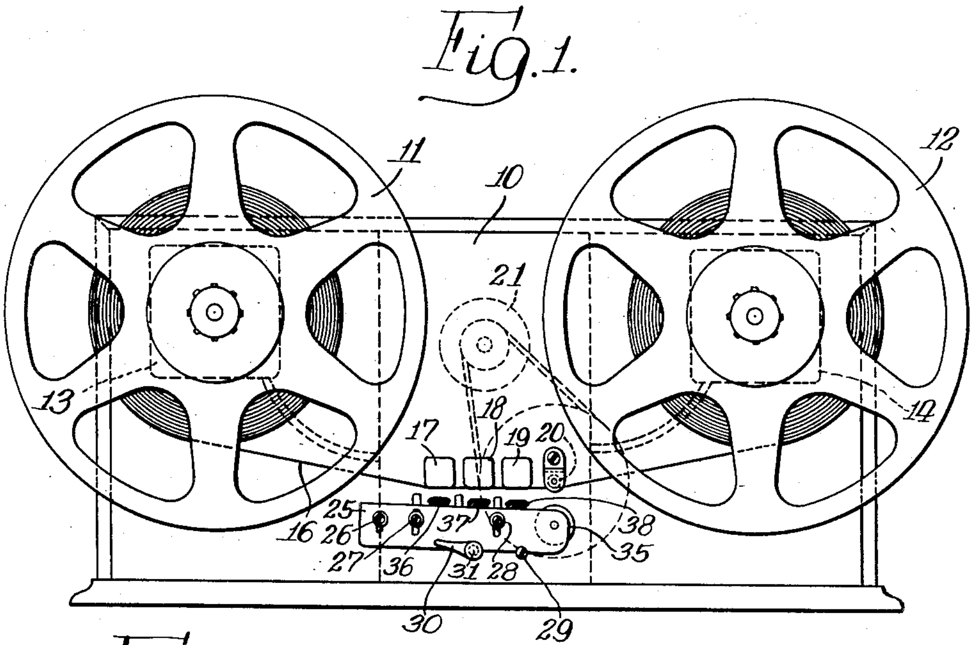
Fig. 1 is a front elevation view of the tape recording and reproducing apparatus in accordance with the invention.

Referring now particularly to the drawings, in Fig. 1 there is illustrated the recording and reproducing device which includes a housing 10 with reels 11 and 12 supported thereon. The reel 11 is driven by a motor 13 and the reel 12 by a motor 14. The tape 16 is wound upon and extends between the reels 11 and 12 and is positioned along the magnetic heads 17, 18 and 19. The head 17 may be an erase head to remove magnetic charges from the tape before applying new charges thereto. The head 18 is the recording head which produces magnetic influences in the tape, and the head 19 is the play or reproduce head which picks up magnetic charges in the tape to produce audio or other reproduction thereof. A capstan 20 is provided in engagement with the tape to control the speed thereof during recording operation. The capstan is driven by a motor 21 through a belt drive.

Figure 2:
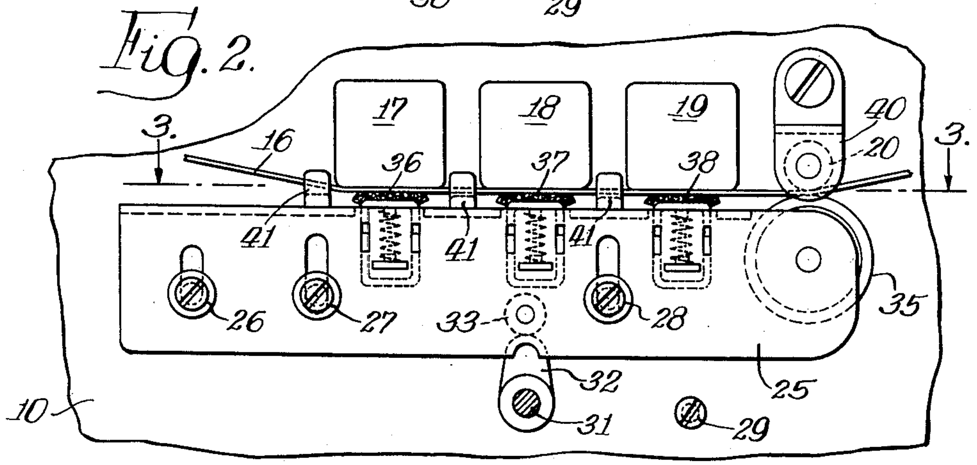
Fig. 2 is an enlarged detailed view showing the device in recording or reproducing position.
Figure 3:
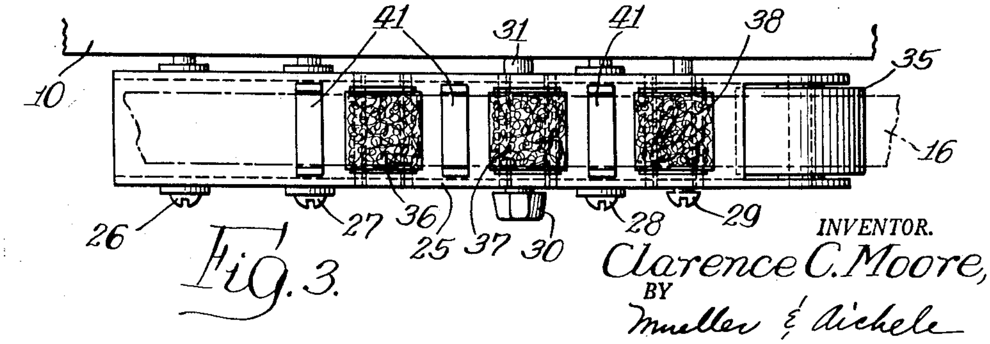
Fig. 3 is a cross section view along the lines 3—3 of Fig. 2.

Positioned on the opposite side of the tape 16 from the magnetic heads and the capstan is a pressure arm 25. This arm is supported from screws 26, 27, 28 and 29 mounted on the housing 10. An operating member 30 moves a control shaft 31 which has a cam 32 thereon engaging roller 33 of the pressure arm, as best shown in Fig. 2. As the shaft 31 is rotated by movement of the member 30, the pressure arm is moved to the position shown in Fig. 2 wherein the roller 35 engages the tape 16 to cause the same to bear against the capstan 20. As an example, the capstan 20 may be made of metal and the roller of a resilient material such as rubber. This provides controlled feeding of the tape 16 at the speed determined by the speed of the capstan 20. The pressure arm 25 may include individual pressure pads 36, 37 and 38, backed by springs, which engage the tape opposite the magnetic heads 17, 18 and 19 to hold the tape firmly against these heads. A tape guide 40 may be provided adjacent the capstan 20, and additional guides 41 may be provided along the pressure arm 25 so that the position of the tape will be accurately controlled during operation of the device, that is, recording, reproducing or erasing action.

Figure 4:
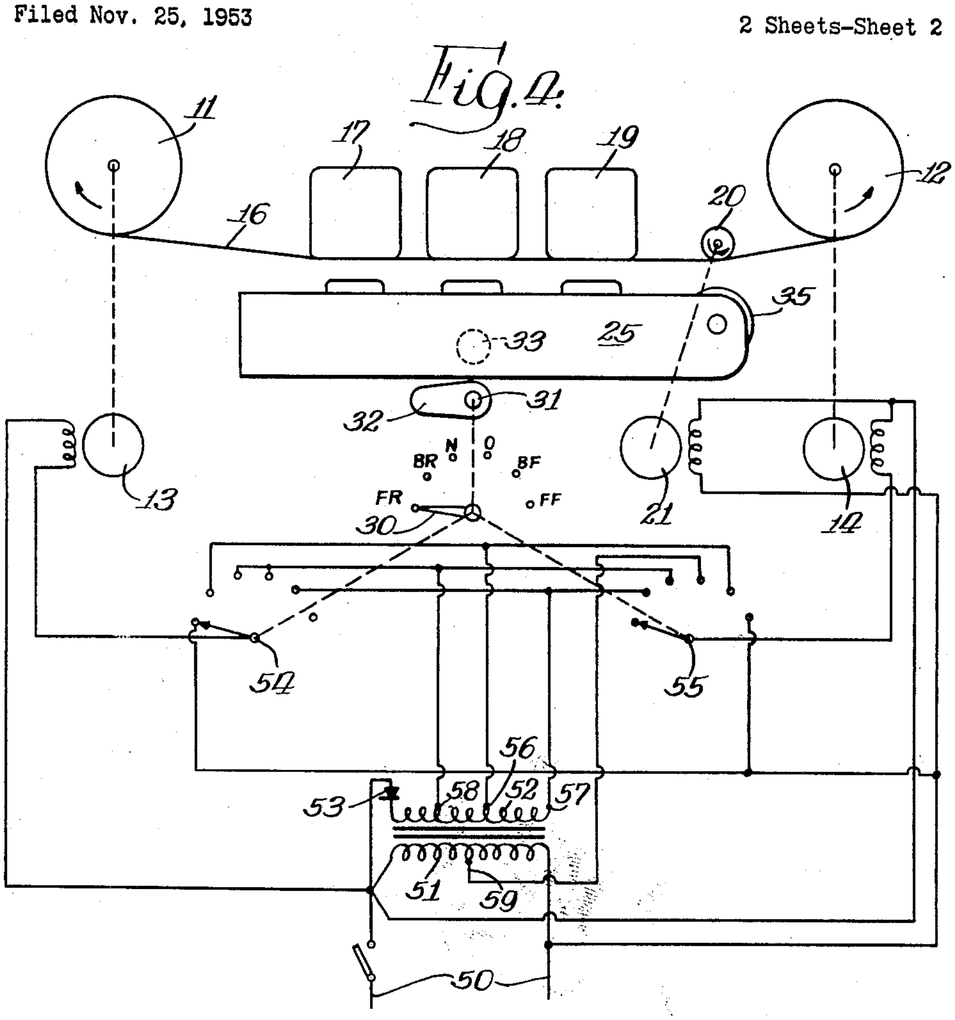
Fig. 4 is a combined schematic and circuit diagram of the recorder control system.

Reference is now made to Fig. 4 which is a schematic diagram illustrating the operation of the system. The system is driven from an alternating current source 50 which may be the standard 115 volt alternating current supply. It will be noted that this source is directly connected to the motor 21 which drives the capstan 20. This motor may be a synchronous motor operating at a highly constant speed. Also connected to the source 50 is a transformer including a primary winding 51 and a secondary winding 52. It will be noted that the secondary winding 52 is connected in series with a rectifier 53. Therefore, a pulsating direct current may be derived from the winding 52.

The motors 13 and 14 which drive the reels 11 and 12 respectively are energized from the transformer, with the current supplied thereto being controlled by switches 54 and 55 respectively. The switches 54 and 55 are ganged to the control member 30 and the cam 32 to be operated by the control member. This ganging may be accomplished by mounting the switches on the shaft 31 or in any other desired manner. As indicated about the control member 30, six different operating positions are provided. These positions are marked as follows:

FR=fast reverse
BR=brake reverse
N=neutral
O=operate
BF=brake forward
FF=fast forward Movement of the arm to these various positions controls the position of switches 54 and 55 and cam 32 so that the speed of the motors and the braking action thereof, and also the position of the pressure arm 25, all cooperate to provide the desired action.

Considering first the FR position shown, to provide fast reverse operation the reverse reel 11 is driven by motor 13 at full speed. This is accomplished by connecting the motor 13 directly across the power supply 50 through the switch 54. It will be noted that for this operation switch 55 opens the circuit to the motor 14 driving the forward reel 12. When the switch arm is in the position FR for fast reverse, the pressure device 25 is released from the tape as shown in Fig. 4. This is because the cam 32 does not engage the roller 33. This permits the tape to move freely with respect to the magnetic heads and the capstan.

The next position of the operating member, in a clockwise direction, is the brake reverse position. When the tape is being reversed rapidly, it may be desired to stop the movement thereof quickly. By moving the arm 30 clockwise from the fast reverse to the BR position this is accomplished. It will be noted that when the arm 30 is in this position, switch 54 will connect the reverse motor 13 to the terminal 56 on secondary winding 52 so that the rectified current in a portion of the secondary winding will be applied to the motor 13. This will provide certain braking action of the motor. At this same time switch 55 will connect motor 14 to the end terminal 57 of the secondary winding 52 so that the entire rectified voltage in the secondary 52 will be applied to the motor 14. This will provide even greater braking action of the forward reel 12. This results in a differential braking action so that the reverse reel 11 is restrained to a certain degree and the forward reel 12 is restrained to a larger degree. This causes a very quick stop of the movement of the tape but minimizes the tension in the tape resulting from the braking action so that the tendency of the tape to sever or tear is effectively eliminated. It will be obvious that braking action on the motor 13 alone would result in spinning of the reel 12 so that a large amount of tape would be accumulated between the reels. Likewise braking action on the motor 14 alone would result in excessive tension in the tape which might cause the same to be severed. By providing somewhat greater action in the reel 12 than in the reel 11, very rapid stopping is provided without undue tension in the tape.

Continuing with the movement of the control member 30 in a clockwise direction, the third position N is the neutral position. In this position both motors are connected to the terminal 58 on the secondary 52 so that a small direct current potential is applied thereto to provide light braking action. This holds the tape steady so that the reels are not inadvertently moved to provide undue slack or to change the position of the tape with respect to the magnetic heads. When the control member 30 is moved from the fast reverse position through the brake reverse and neutral positions, the pressure device remains in a position removed from the tape. In the neutral position the cam 32 approaches the roller 33 but is not moved clockwise sufficiently to force the pressure arm into engagement with the tape.

In the next position of the control member 30, which is the operating position, braking action is still provided for the motor 13 driving the reverse reel 11 by connection thereof to the terminal 58 on the secondary 52.

At this time the switch 55 connects the motor 14 to the intermediate tap 59 on the primary winding so that a portion of the voltage of the source is applied to the motor 14 to drive the forward reel 12. This moves the tape in a forward direction at a slow rate of speed as used in the operation of the device. It is to be pointed out, however, that the motor 14 and reel 12 provide only generally the speed of operation and the precise speed is controlled by the capstan 20. It will be obvious that when the arm 30 is in the 0 operating position, the cam 32 will engage the roller 33 to hold the pressure device 25 in such position that the roller 35 bears against the tape to hold it firmly against the capstan. This position is shown in Fig. 2 of the drawings.

Considering now the fast forward and brake forward positions, in both of these positions the pressure device is released so that the tape moves freely along the control heads and the capstan 20. In the FF, fast forward position, switch 55 connects the motor 14 directly to the alternating current power supply so that the forward reel is driven at full speed. In this position the switch 54 opens the circuit to the motor 13 so that it moves idly by the movement of the tape. If it is desired to stop the movement, the arm 30 is moved counterclockwise to the BR position at which the switch 55 connects the motor 14 to the terminal 56 on the secondary winding 52 so that the rectified voltage in a portion of the secondary causes braking action of the motor 14. At the same time the switch 54 connects the motor 13 to terminal 57 so that the entire rectified voltage in the secondary 52 is applied to the motor 13 to provide heavy braking action on the reel 11. This therefore is exactly the same action which is provided by the brake reverse position and has the same advantages that fast braking action is provided without causing any undesired slack in the tape and without causing excessive tension in the tape which might sever or tear the same.

It will be noted that the position of the various operations is arranged so that the normal movement of the control arm 30 from the fast forward or fast reverse position causes the braking action to follow so that the tape is slowed down and the recorder can then be immediately turned to operating position. Also it will be apparent that the pressure arm is moved in a manner synchronized with the speed of the tape so that the tape is free during the fast forward and fast reverse movements and is held in the proper position for operation during the movement of the tape at the operating speed. Although a mechanical interconnection between the speed control and the pressure arm mechanism is illustrated, it is obvious that the pressure arm might be moved by a solenoid or other electrical means, and that the synchronization of controls can be provided through electrical connections.

Figure 5:
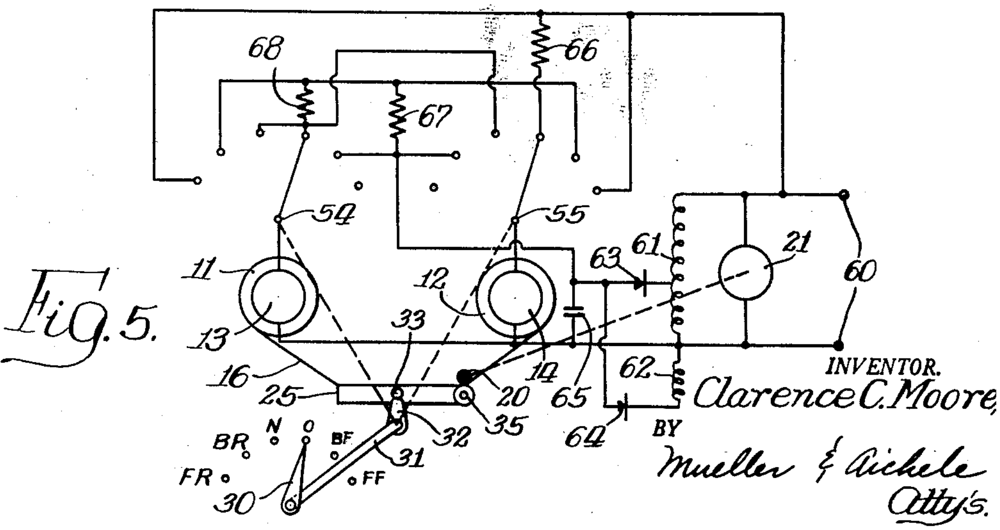
Fig. 5 illustrates a second embodiment of the control system.

In Fig. 5 there is shown an alternate power supply arrangement. The operation of the control member 30, cam 32 and switches 54 and 55 for energizing motors 13 and 14 respectively, is exactly the same as in Fig. 4. The circuit for providing the variable alternating and direct current voltages is different, however. The system may be energized from an alternating current power source 60 across which the motor 21 is directly connected as in Fig. 4. To the power supply there is connected a transformer including windings 61 and 62, and rectifiers 63 and 64 are connected to the transformer to provide full wave rectification so that a substantially steady direct current is developed across condenser 65. The alternating current from the source 60 is selectively applied to motors 13 and 14 as in Fig. 4 except that the lower voltage for operating the motor 14 during recording or reproduction is obtained by the use of dropping resistor 66 instead of providing a tap on the transformer.

Direct current voltages of different values are also provided by the use of dropping resistors as will be explained. The full direct current voltage across condenser 65 is applied to motor 13 in the brake forward position and to the motor 14 in the brake reverse position. The direct current voltage is reduced by resistor 67 for application to the motor 13 in the brake reverse position and to the motor 14 in the brake forward position. A still smaller voltage is provided by use of resistor 68 in series with resistor 67 for application to both motors in the neutral position to hold the same against accidental operation. This small braking voltage is also applied to the motor 13 in the operating position to provide a tension against which the tape is pulled so that the motion thereof will be steady.

It is therefore seen that an improved control system is provided for tape or wire recording and reproducing devices which provides easy control of the various operations by a signal control member. Also, the controls are set up so that natural movement thereof provides the varous operations in the proper sequence. Such control makes it possible to easily and quickly wind a tape from one reel to the other in either direction and to stop at any desired point as may be desired. The tape is held firmly against the magnetic heads during recording or reproducing operations but moves freely with respect thereto for fast winding operations. This is accomplished without the necessity of placing the tape into and out of guides for the different operations since the movement of the pressure arm is automatically synchronized with the application of power to the motors. The energizing and braking operations of the motor are such that there is no danger of slack accumulating in the tape as operation is changed from one type to another and further the tape is not pulled excessively to cause severing or tearing of the same by the action of the driving motors.

Although certain embodiments of the invention have been described which are illustrative thereof, it is obvious that various changes and modifications can be made in the invention within the intended scope of the invention as defined in the appended claims.

I claim:

1. A tape recorder and reproducer including in combination, first and second reels supporting a magnetic tape therebetween, first and second motors individually connected to said reels for driving the same, magnetic head means positioned along said tape between said reels, tape driving means including a capstan extending along said tape and a motor for driving the same, power supply means providing potential to said first and second motors for driving said reels and thereby winding said tape thereon, pressure means movable into an operating position for holding said tape adjacent said head means and in engagement with said capstan to be driven at operating speed thereby, and control means including a single control element for operating said pressure means and for controlling the application of potential from said power supply means to said motors, said control means including a portion connected to said pressure means and operating to move said pressure means into and out of said operating position as said tape is driven at operating speed and at faster speeds for winding the same on said reels.

2. A tape recorder and reproducer including in combination, first and second reels supporting a magnetic tape therebetween, first and second motors individually connected to said reels for driving the same, magnetic head means positioned along said tape between said reels, tape driving means including a capstan extending along said tape and a motor for driving the same, power supply means providing potential to said first and second motors for driving said reels thereon, control means including a single operating element for selectively applying a first potential to said motors to drive the same at a relatively fast rate for winding said tape on said reels, said control means providing a lesser potential to one of said motors for moving said tape at the operating speed, and pressure means movable into an operating position for holding said tape adjacent said head means and in engagement with said capstan to control the operating speed thereby, said control means including cam means connected to said operating element and cooperating with said pressure means to move said pressure means into said operating position as said tape is driven at operating speed and out of said operating position as said tape is driven at faster speeds for winding the same on said reels.

3. A tape recorder and reproducer including in combination, first and second reels for supporting a magnetic strip therebetween, first and second induction motors individually connected to said reels for driving the same, a plurality of magnetic heads positioned along the path of the strip between said reels, tape driving means including a capstan extending along said path of said strip and a motor for driving the same, power supply means providing alternating current and direct current potentials, control means including switch means for selectively applying alternating current to said first and second motors for driving said reels and thereby winding the strip thereon, said switch means selectively applying direct current to said motors for braking the same, and pressure means movable into an operating position for holding said tape against said heads and in engagement with said capstan to be driven at operating speed thereby, said control means including a control shaft having cam means therewith cooperating with said pressure means, said cam means operating to move said pressure means into and out of said operating position as said control shaft is moved said control shaft being connected to said switch means for operating the same simultaneously with operation of said cam means, so that said pressure means is moved into operating position as said tape is driven at operating speed and is moved out of operating position as said tape is driven at faster speeds for winding the same on said reels.

4. A recording device in accordance with claim 3 wherein said switch means has one position for providing alternating current of relatively high voltage to one of said motors for providing fast movement thereof, a second position for providing direct current of relatively high voltage to the other one of said motors for providing heavy braking thereof, and a third position for providing lower alternating current voltage to said one motor for driving the same at a slower speed and for providing a lower direct current voltage to said other motor for providing light braking thereof.

5. A magnetic recording device in accordance with claim 3 wherein said switch means selectively applies alternating current of relatively high voltage for driving said motors at high speed and alternating current of lower voltage to at least one of said motors for driving the same at a slower speed, said switch means also selectively applying direct current of relatively high voltage to said motors for providing heavy braking thereof and direct current of relatively low voltage to said motors for providing lighter braking thereof.

6. A magnetic recording device in accordance with claim 3 wherein said switch means provides a relatively large direct current voltage to one of said motors for providing heavy braking thereof and a relatively small direct current voltage to the other of said motors for providing light braking thereof to rapidly stop movement of the strip in the direction to be accumulated on the reel associated with said second motor.

7. In a device including first and second reels on which an elongated strip of material is wound with the strip extending from one reel to the other, apparatus for winding the strip from one reel to the other including in combination, first and second induction motors individually connected to said reels, power supply means providing alternating and direct current potentials, and circuit means including switch means for selectively applying said alternating and direct current potentials to said motors, said switch means having a first position for applying alternating current potential to one of said motors to thereby drive the associated reel at a relatively high speed, said switch means having a second position for applying direct current of a first potential to said one motor and direct current of a greater potential to the other one of said motors to brake the movement of said reels and quickly stop the movement of the strip.

8. In a device including first and second reels on which an elongated strip of material is wound with the strip extending from one reel to the other, apparatus for winding the strip from one reel to the other including in combination, first and second induction motors individually connected to said reels, power supply means operating from alternating current and including rectifier means providing a pulsating direct current potential, and circuit means including switch means for selectively applying said alternating and direct current potentials to said motor means, said switch means having a first position for applying alternating current voltage to one of said motors to thereby drive the associated reel at a relatively high speed, said switch means having a second position for applying pulsating direct current of a first voltage to said one motor and pulsating direct current of a greater voltage to the other one of said motors to brake the movement of said reels and quickly stop the movement of the strip.

9. A magnetic recording and reproducing device for operation with an elongated strip of material susceptible to being magnetized, which strip is supported on first and second reels and extends therebetween, said device including in combination, magnetic means positioned along the path of the strip between the reels, pressure means movable to an operating position for holding the strip against said magnetic means, first and second induction motors individually connected to said reels for driving the same, power supply means operating from an alternating current source and including rectifier means for providing direct current, and control means coupled to said pressure means and to said power supply means, said control means including a single control arm for controlling the position of said pressure means and for selectively applying current to said motors, said control means being arranged to selectively apply alternating current of a predetermined voltage to said motors to drive the same and thereby cause movement of the strip in either direction at a relatively fast speed, said control means selectively applying direct current at different potentials to said motors to brake said motors and thereby stop the movement of the strip, and said control means applying an alternating current voltage less than said predetermined voltage to one of said motors to thereby cause movement of the strip at a relatively slow operating speed and simultaneously holding said pressure means in said operating position during movement of the strip at the operating speed.

10. In a device having first and second reels on which an elongated strip of material is wound, with the strip extending from one reel to the other, apparatus for winding the strip from one reel to another including in combination, first and second induction motors individually connected to the reels for driving the same, power supply means providing alternating current and direct current potentials, and control means including switch means and circuit means coupled to said power supply means and to said motors for selectively applying alternating current and direct current potentials to said motors, said control means having one position for providing alternating current of relatively high voltage to one of said motors for providing fast movement thereof, a second position for providing direct current of relatively high voltage to the other one of said motors for providing heavy braking thereof, and a third position for providing lower alternating current voltage to said one motor for driving the same at slower operating speed and for providing a lower direct current voltage to said other motor for providing light braking thereof.

11. In a magnetic recording and reproducing device having first and second reels on which an elongated strip of material susceptible to being magnetized is wound, with the strip extending from one reel to the other, apparatus for winding the strip from one reel to another including in combination, first and second induction motors individually connected to the reels for driving the same, power supply means providing alternating current and direct current potentials, and control means coupled to said power supply means for selectively applying alternating current and direct current potentials to said motors, said control means having one position for providing alternating current of relatively high voltage to said first motor for providing fast movement thereof, a second position for providing direct current of relatively low voltage to said first motor and direct current of relatively high voltage to said second motor for providing heavy braking thereof, and a third position for providing lower alternating current voltage to one of said motors for driving the same at a slower operating speed and for providing a relatively low direct current voltage to the other one of said motors for providing light braking thereof.

12. In a device having first and second reels on which an elongated strip of material is wound, with the strip extending from one reel to the other, apparatus for winding the strip from one reel to another including in combination, first and second induction motors individually connected to the reels for driving the same, power supply means providing alternating current and direct current, and control means including switch means and circuit means coupled to said power supply means and to said motors for selectively applying current to said motors, said control means selectively applying alternating current of relatively high voltage for driving said motors at high speed and alternating current of lower voltage to at least one of said motors for driving the same at a slower speed, said control means also selectively applying direct current of relatively high voltage to said motors for providing heavy braking thereof and direct current of lower voltage to said motors for providing lighter braking thereof.

13. In a device having first and second reels on which an elongated strip of material is wound, with the strip extending from one reel to the other, apparatus for winding the strip from one reel to another including in combination, first and second induction motors individually connected to the reels for driving the same, power supply means providing alternating current and direct current potentials, and control means coupled to said power supply means for selectively applying alternating current and direct current potentials to said motors, said control means having a first control positon applying alternating current to said first motor for causing said first motor to run to wind the strip on the first reel, said control means having a second control position applying a given direct current potential to said second motor and a smaller direct current potential to said first motor for providing braking action in said motors to stop the winding of the strip on the second reel, and said control means having a control positon applying alternating current to said second motor for causing said second motor to run to wind the strip on the second reel, and said control means having a fourth control position for providing a given direct current potential to said first motor and a smaller direct current potential to said second motor for providing braking action in said motors to stop the winding of the strip on the second reel.

14. Apparatus in accordance with claim 13 wherein said control means includes a single resistor for providing the smaller direct current potential applied in said second and fourth control positions to said first and second motors respectively.

References Cited in the file of this patent

UNITED STATES PATENTS

| | | |
|---|---|---|
| 1,997,464 | Krebs | Apr. 9, 1935 |
| 2,280,991 | Wickerham et al. | Apr. 28, 1942 |
| 2,535,486 | Dank | Dec. 26, 1950 |